United States Patent Office 3,658,723
Patented Apr. 25, 1972

3,658,723
PREPARATION OF CATALYTICALLY ACTIVE HALIDES OF TITANIUM BY REACTING TITANIUM TETRAHALIDES WITH MAGNESIUM AMALGAM
Reginald F. Roberts, Jr., Baton Rouge, La., assignor to The Dow Chemical Company, Midland, Mich.
No Drawing. Filed Feb. 20, 1970, Ser. No. 13,202
Int. Cl. B01j $11/78$
U.S. Cl. 252—441                                           6 Claims

ABSTRACT OF THE DISCLOSURE

Titanium tetrahalide is contacted with a mixture of magnesium powder and mercury, so-called magnesium amalgam, in an inert system to produce a catalytically active halide of titanium which is effective in the low pressure polymerization of ethylene and other $\alpha$-olefins.

BACKGROUND OF THE INVENTION

This invention relates to the preparation of metal catalysts suitably employed in the polymerization of ethylene and other $\alpha$-olefins, and more particularly, to a method for obtaining substantially pure and catalytically active halides of titanium from titanium tetrahalides.

Catalytically active halides of titanium, e.g., the $\alpha,\beta$ and $\gamma$ varieties of titanium trichloride, are often used as catalysts in low pressure polymerization of olefins such as ethylene, propylene and the like.

Conventionally such catalytically active halides of titanium are prepared by reducing titanium tetrahalides with compounds such as aluminum alkyls, e.g., triethyl aluminum and triisobutyl aluminum, or alkyl aluminum halides such as diethyl aluminum chloride. Such reactions are generally carried out in inert organic solvent systems under an inert atmosphere at relatively mild temperatures. During polymerization of ethylene or similar olefin, the olefin is usually passed into a reactor containing a dilute suspension of the catalyst in an organic liquid. The pressure in the reactor is generally maintained at a fairly low value when compared to that employed in high pressure polymerization.

Unfortunately, catalytically active halides of titanium prepared in this manner are often neither sufficiently pure nor sufficiently active to be effectively employed in many instances. In order to remove various impurities which tend to deactivate the catalyst and/or deleteriously affect the desired polymer from the titanium halide, it is a general practice to wash the halide repeatedly with some inert organic liquid. To increase the catalytic activity of the active titanium halide, it is conventional to contact the titanium halide with more of the reducing component, e.g., an aluminum alkyl. Both of these purification and further activation procedures are time consuming and expensive and often do not accomplish the intended objective. Moreover, the catalytically active titanium halide always contains a residual quantity of aluminum halide and/or aluminum alkyl halide which cannot be effectively removed by further washing.

In another conventional technique, catalytically active halides of titanium are prepared by contacting titanium tetrahalides with phenylmagnesium halides or similar compounds in an inert medium. Unfortunately, however, phenylmagnesium halides and analogous compounds are subject to the same objections as aluminum alkyls or alkyl aluminum halides.

In view of the deficiencies in prior art methods, it would be highly desirable to provide a practical method for making catalytically active halides of titanium of a high purity.

SUMMARY OF THE INVENTION

In accordance with the present invention, essentially pure, catalytically active halides of titanium are prepared by intimately mixing titanium tetrahalide with from about 0.01 to about 4 atom weights of magnesium metal and from about 0.01 to about 200 atom weights of mercury per mole weight of titanium tetrahalide, the atomic ratio of mercury to magnesium ranging from about 0.002:1 to about 20,000:1. Advantageously the catalytically active titanium halide composition is recovered from the reaction mixture by separating the catalytically active solids from the remaining unreacted liquid starting materials. The catalytically active titanium halide is an effective and efficient catalyst in low pressure polymerization of ethylene and other $\alpha$-olefins.

Catalytically active titanium halides produced by the method of this invention do not contain organometallic impurities and have very high polymerization efficiencies, particularly at relatively low concentrations of catalyst.

DESCRIPTION OF THE PREFERRED EMBODIMENTS

In carrying out the initial step of this novel method, it is preferable, although not required, to dissolve the titanium tetrahalide, e.g., titanium tetrachloride, titanium tetrabromide, or titanium tetraiodide, preferably titanium tetrachloride, in an inert organic liquid such as hexane or another aliphatic liquid hydrocarbon and subsequently to add the magnesium and mercury as a mixture, a so-called magnesium amalgam. It is understood, however, that the magnesium and mercury can be added separately to the titanium tetrahalide. Also, it is suitable to add the titanium tetrahalide to the magnesium amalgam dispersed in an inert organic liquid or to either one of magnesium and mercury followed by the addition of the other. It is also understood that the titanium tetrahalide, mercury and magnesium can be mixed together simultaneously by the continuous addition of each to a reactor, preferably containing an inert organic liquid. Reaction of the three metal components can also occur in the absence of an inert organic liquid, but addition of the organic liquid is generally preferable to control the rate and heat of reaction.

Exemplary of inert organic liquids preferably employed are the aliphatic hydrocarbons such as hexane, heptane, cyclohexane and the like; the aromatic hydrocarbons such as benzene and toluene; and other organic liquids conventionally employed in the preparation of metal polymerization catalysts of the Ziegler-Natta type. Such liquids are generally employed in amounts such that the resulting concentration of titanium in the total mixture ranges from about 0.1 molar to about 2 molar, preferably from about 0.5 molar to about 1 molar.

Mixture of the titanium tetrahalide, mercury and magnesium is preferably carried out in an inert atmosphere such as nitrogen or helium and in the essential absence of oxygen, moisture, carbon dioxide and similar contaminants.

To realize effective and efficient activation of the titanium tetrahalide, it is advantageous to employ from about 0.1 to about 4.0 atom weights of magnesium and from about 1 to about 200 atom weights of mercury per mole weight of titanium tetrahalide, preferably from about 0.5 to about 1.0 atom weight of magnesium and from about 5 to about 10 atom weights of mercury. To optimize the reduction of titanium, an atomic ratio of mercury to magnesium from about 0.002:1 to about 20,000:1 is employed, preferably from about 5:1 to about 20:1.

It is preferable to employ the magnesium in the form of a fine powder as it is much easier for the mercury to interact with it in this form. However, the magnesium can be operably employed as granules, strips or the like. Amalgamation of the magnesium is readily effected at ambient conditions by mixing the magnesium, preferably as a fine powder, with the mercury.

During mixing of the titanium tetrahalide, mercury and magnesium and subsequent activation of the titanium, temperature and pressure of the mixture can range from about 0° to about 100° C. and from about 0.1 to about 10 atmospheres, preferably from about 20° to about 40° C. and from about 1 to about 2 atmospheres. Activation of the titanium tetrahalide is facilitated by vigorous agitation of the mixture throughout the reaction period. Such agitation effects intimate contact between the amalgam and titanium tetrahalide and is satisfactorily achieved with conventional agitators or stirrers. Under these conditions, effective activation of the titanium generally occurs within one to 60 minutes.

Following activation of titanium, tetrahalide, agitation of the reaction mixture is stopped, and the catalytically active solids are separated from the remaining unreacted liquid starting materials. In instances wherein activation is carried out in an inert organic liquid and in the presence of an excess of mercury, the mercury and organic phases are permitted to separate into layers on standing. The organic layer, which contains the catalytically active titanium halide, is removed from the mercury layer. Although not required, the catalytically active titanium compound can be collected in the form of a precipitate from the organic layer and washed in an organic liquid to remove any unreduced titanium tetrahalide. Collection of the precipitate can be accomplished by centrifugation, decantation and/or filtration.

When titanium tetrachloride is employed as a starting material, the primary lower chloride of titanium produced by the method of this invention appears to be the $\beta$ modification of titanium trichloride. However, other modifications of titanium trichloride, e.g., $\alpha$, $\gamma$ and $\delta$ modifications, and titanium dihalide may also be produced, particularly when the reaction conditions of the method of this invention are varied within the ranges specified hereinbefore. While their chemical structures have not actually been determined, catalytically active bromides and iodides of titanium produced by the method of this invention also probably exist as reduced titanium bromides or iodides. However, the method of this invention is not limited to the production of a particular species of titanium halide because in all instances a catalytically active material is produced when titanium tetrahalide is mixed with mercury and magnesium in accordance with said method.

In the polymerization of ethylene or other $\alpha$-olefin, the olefin is preferably fed into a dispersion of the above-described catalyst in an inert liquid at concentrations from about 0.005 to 5 millimolar of titanium catalyst in the liquid, preferably from about 0.05 to about 0.5 millimolar. Preferably, upward of $4 \times 10^{-7}$ mole of titanium catalyst is used per gram of polymer produced. Polymerization proceeds advantageously at from about 20° to about 90° C. and under an inert atmosphere such as nitrogen or an atmosphere of $\alpha$-olefin at pressures from about 1 to about 10 atmospheres. Pressures greater than 1 atmosphere, e.g., 3 to 7 atmospheres, are generally employed when the polymerization temperature exceeds the boiling point of the inert liquid at atmospheric pressure. The inert organic liquid is a liquid under the conditions of temperature and pressure employed and has a solvating action on the olefin. Hydrocarbon solvents are preferred, and are preferably substantially free of materials that react with lower halides of titanium such as water, carbon dioxide, oxygen and the like. Examples of such solvents are pentane, hexane, cyclohexane, octane, benzene, xylene, toluene and the like.

The following examples are given to illustrate the invention and should not be construed as limiting its scope.

All concentrations are by weight unless otherwise indicated.

EXAMPLE 1

To 0.1077 g. of powdered magnesium in approximately 70 g. of mercury in a nitrogen purged 1-liter catalyst bottle at ambient temperature and pressure is added, slowly 17.7 ml. of 500 millimolar titanium tetrachloride in hexane. The bottle is swirled at ~100 r.p.m. for 2–3 minutes and 200 ml. more of hexane is added. Swirling of the bottle is resumed to cause intimate contact between the titanium tetrachloride and the amalgam and continued until brownish black soilds form at the hexane/mercury interface (approx. 10 minutes). The phases are separated with a separating funnel and the catalytically active solids are washed with hexane.

Into a 3-liter stirred reactor containing 1.24 millimoles of the recovered catalyst (lower chloride of titanium) in 2 liters of hexane under an atmosphere of hydrogen is fed a continuous stream of ethylene at a rate sufficient to maintain a reactor pressure of 45 p.s.i.g. at 80° C. and an $C_2H_4/H_2$ mole ratio of approximately 1:1. After 30 minutes, the polymerization is stopped by shutting off ethylene feed and displacing unreacted ethylene with nitrogen. The polymer slurry is filtered and the filtered polyethylene powder is washed with hexane and dried. The yield of dried polyethylene powder is 118 g. which corresponds to 620 g. of polyethylene per gram of titanium compound. The catalyst efficiency for this example is recorded in Table I.

For the purposes of comparison, several control polymerization runs ($C_x$) similar to the preceding one are carried out except that $\beta$-titanium trichloride in varying amounts is employed as the catalyst. In these runs $\beta$-titanium trichloride is prepared in a conventional manner by reacting titanium tetrachloride with triisobutyl aluminum in hexane under a nitrogen atmosphere, the atomic ratio of aluminum to titanium being 1.2:1. The hexane containing organic soluble impurities is decanted from the precipitated $\beta$-titanium trichloride which is then washed with hexane. The washed $\beta$-titanium trichloride is dispersed in hexane and activated by contacting it with additional triisobutyl aluminum. The polyethylenes resulting from these several runs are recovered in a manner similar to the preceding one. The catalyst efficiencies for these runs are recorded in Table I.

TABLE I

| Sample Run No. | Catalyst | Catalyst concentration, millimoles of Ti | Catalyst efficiency [1] |
|---|---|---|---|
| 1 | CATH [2] | 1.24 | 620 |
| $C_1$ [3] | Conventional $\beta$-TiCl$_3$ | 1 | ~400 |
| $C_2$ [3] | do | 2 | ~400 |
| $C_3$ [3] | do | 4 | ~400 |
| $C_4$ [3] | do | 10 | ~400 |

[1] Not an example of the invention.
[2] Catalytically active titanium halide produced by reacting TiCl$_4$ with Hg/Mg (Mg:Ti=0.5:1).
[3] Catalyst efficiency is given as grams of polyethylene produced per ram of titanium compound in 30 minute polymerization period.

EXAMPLES 2 AND 3

Two runs are carried out employing catalyst preparation and ethylene polymerization procedures similar to those employed in Example 1 except that different catalyst concentrations are utilized in polymerization. The results in terms of catalysts efficiencies are shown in Table II.

TABLE II

| | Catalyst concentration, millimoles of Ti | Catalyst efficiency [1] |
|---|---|---|
| Sample run number: | | |
| 2 | 0.42 | 1,260 |
| 3 | 5 | 337 |

[1] Same as in Table I.

Similar results are observed when the prior examples are repeated using titanium bromide and iodide and different ratios of mercury, magnesium and titanium within the ranges specified.

What is claimed is:

1. A method for preparing an improved titanium catalyst useful in low pressure polymerization of α-olefins comprising the steps of (1) intimately mixing together a titanium tetrahalide with from about 0.01 to about 4 atom weights of magnesium metal and from about 0.01 to about 200 atom weights of mercury per mole weight of titanium tetrahalide, the atomic ratio of mercury to magnesium ranging from about 0.002:1 to about 20,000:1, at temperature in the range from about 0° to about 100° C.

2. The method according to claim 1 for preparing an improved titanium catalyst useful in low pressure polymerization of α-olefins comprising the steps (1) intimately mixing together a titanium tetrahalide with from about 0.01 to about 4 atom weights of magnesium metal and from about 0.01 to about 200 atom weights of mercury per mole weight of titanium tetrahalide, the atomic ratio of mercury to magnesium ranging from about 0.002:1 to about 20,000:1, at temperature in the range from about 20° C. to about 40° C., and (2) recovering catalytically active titanium halide composition from the reaction mixture.

3. The method according to claim 2 for preparing an improved catalyst useful in low pressure polymerization of α-olefins comprising the steps of (1) intimately mixing a titanium tetrahalide in inert organic liquid with from about 0.01 to about 4 atom weights of magnesium metal and an excess of mercury per mole weight of titanium tetrahalide, the atomic ratio of mercury to magnesium less than about 20,000:1; (2) allowing the resulting mixture to separate into a mercury layer and an organic layer containing reduced titanium halide; and (3) withdrawing the organic layer from the mercury layer.

4. The method according to claim 2 wherein the titanium tetrahalide is titanium tetrachloride.

5. The method according to claim 2 wherein the magnesium and mercury are mixed to form magnesium amalgam before mixing with titanium tetrahalide.

6. A catalyst prepared by the method of claim 1.

References Cited
UNITED STATES PATENTS

| | | | |
|---|---|---|---|
| 3,014,021 | 12/1961 | D'Alelio | 252—441 X |
| 3,146,224 | 8/1964 | Coover et al. | 252—441 X |
| 3,179,601 | 4/1965 | Kummer | 252—441 |
| 3,365,434 | 1/1968 | Coover et al. | 252—442 X |

OTHER REFERENCES

Barksdale, Titanium—Its Occurrence, Chemistry, and Technology, Ronald Press Co., New York, N.Y. (1966) pp. 96 and 98.

PATRICK P. GARVIN, Primary Examiner

U.S. Cl. X.R.

260—93.7, 94.9

UNITED STATES PATENT OFFICE
CERTIFICATE OF CORRECTION

Patent No. 3,658,723          Dated    25 April 1972

Inventor(s)   Reginald F. Roberts, Jr.

It is certified that error appears in the above-identified patent and that said Letters Patent are hereby corrected as shown below:

Column 4, Table I, the numbers of footnotes 1 and 3 are wrong, they should read:

1 Catalyst efficiency is given as grams of polyethylene produced per gram of titanium compound in 30 minute polymerization period.

3 Not an example of the invention.

Column 4, line 64, change "catalysts" to --catalyst--.

Column 5, line 16, insert --of-- between "steps" and "(1)".

Signed and sealed this 10th day of October 1972.

(SEAL)
Attest:

EDWARD M.FLETCHER,JR.          ROBERT GOTTSCHALK
Attesting Officer              Commissioner of Patents